UNITED STATES PATENT OFFICE.

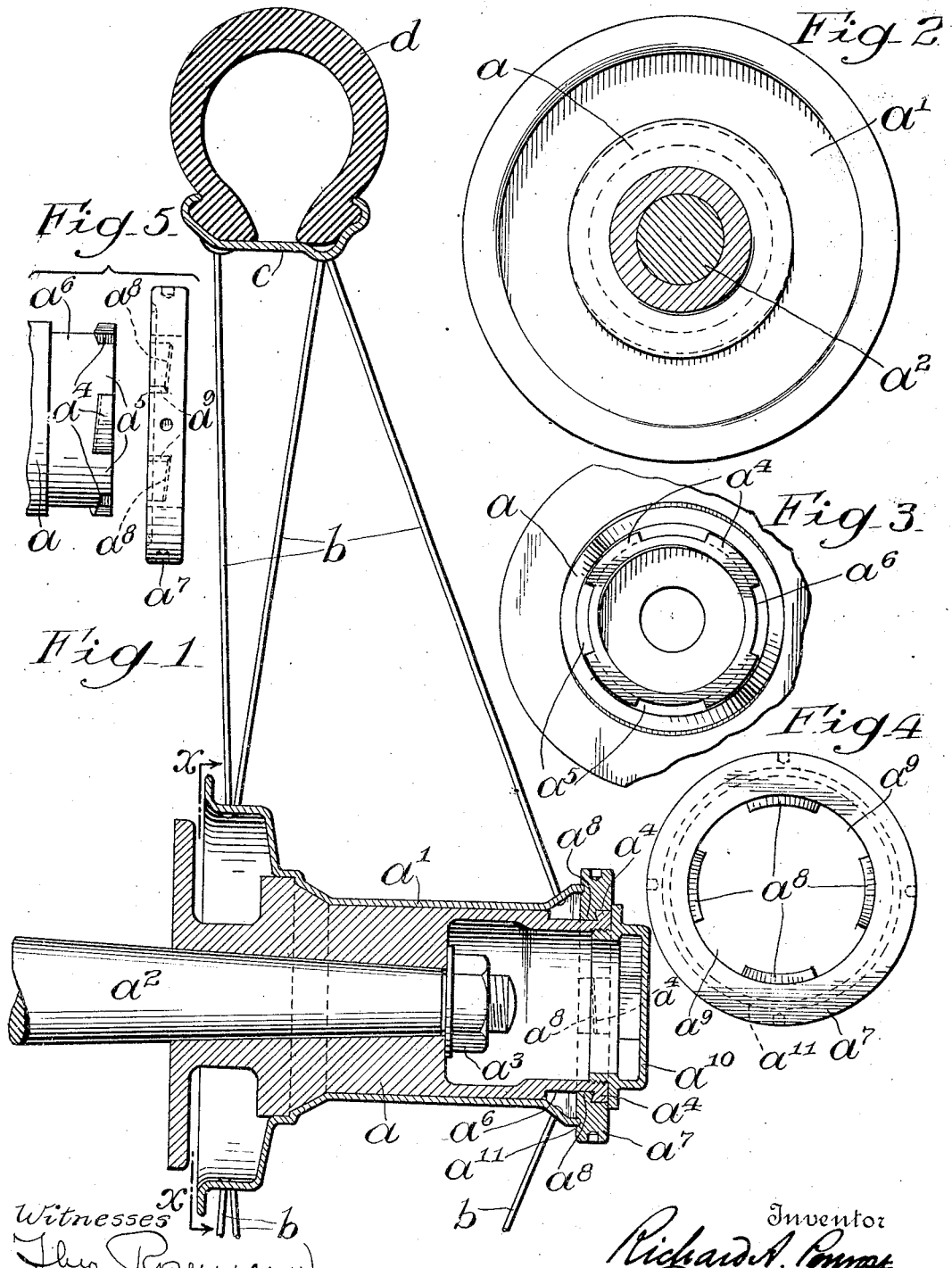

RICHARD A. PENROSE, OF PHILADELPHIA, PENNSYLVANIA.

DETACHABLE VEHICLE-WHEEL.

1,236,477.

Specification of Letters Patent. Patented Aug. 14, 1917.

Application filed August 3, 1916. Serial No. 112,915.

*To all whom it may concern:*

Be it known that I, RICHARD A. PENROSE, a citizen of the United States, residing at the city of Philadelphia, in the county of Philadelphia and State of Pennsylvania, have invented certain new and useful Improvements in Detachable Vehicle-Wheels, of which the following is a specification.

My invention generally stated relates to the hub for a detachable wire or other type of vehicle wheel and has reference particularly to the constructive arrangement of the hub for such type or kind of wheel, consisting of separately formed hub members, the outer member or shell being provided with the spokes and the rim of the wheel and which member is removably fitted to the inner member having as part of the same a substantially elliptical-shaped flange for being jammed against the outer member or shell against rotation of the shell member independent of said inner member.

My invention in the relation stated has been especially designed for use in connection with a detachable or demountable vehicle wheel, such as an automobile wheel provided with either a solid or pneumatic tire, the constructive arrangement being such that when it is found necessary to remove and replace a worn or injured tire or damaged wheel the detachable or demountable portion of such wheel is so arranged as to be quickly removed and replaced by another complemental member of such a wheel fitted with a perfect tire to thereby avoid the immediate necessity of repairing the injured tire or damaged member and fitting such to the wheel.

Among the principal objects of my present invention is to provide an improvement in hubs for a demountable wheel so constructively arranged as to provide an interlocking connection of the one hub member with the other hub member, without the necessity of using intermediate engaging or interlocking means connected with said members, for such purpose, and whereby is permitted not only the ready and secure application of one member to the other without possible independent movement of said members, but also equally so, the ready separation of such members, when the wheel is to be detached or demounted and readily assembled, when the wheel is to be replaced.

A further object of my invention is to provide interlocking or non-rotative connection between the two hub members by the provision with one member of a substantially elliptical-shaped flange formed as part of the same, whereby through the engaging of the flange with the other member such a defined connection alone is established with the said member as to provide a non-rotative relation between the said two members of the hub of the wheel.

A further object of my invention is to provide a wheel with separable telescoping hub-members having beveled lugs on the outer end of the inner of said hub-members and a locking-means having complemental spaced beveled lugs, the emplacement of the locking-means forcing the outer hub-member to seated position on the inner hub-member, to thus prevent detachment of the said locking-means in operative position.

My invention stated in general terms, consists of a quick demountable or detachable wire or other type of vehicle wheel constructively arranged in substantially the manner hereinafter described and claimed.

The nature and scope of my present invention will be more fully understood from the following description taken in connection with the accompanying drawings forming part hereof, in which—

Figure 1, is a view partly in elevation and partly in section of a detachable or demountable vehicle-wheel, embodying the salient features as to the constructive arrangement of my said invention.

Fig. 2, is a vertical sectional view on the line $x, x$ Fig. 1, of the connected hub members of the said wheel, showing the substantially elliptical flange portion of the inner hub member.

Fig. 3, is an elevational view of the front end of the composite hub.

Fig. 4, is a similar view of the hub lock-ring; and

Fig. 5 is a plan view of the inner hub member with the lugs formed therewith and the slots formed therein and of the lock-ring to embrace and enter between respectively said slots so as to become lockingly engaged therewith against detachment from said hub member.

Referring to the drawings, the hub comprises an inner member $a$, and a shell $a^1$, fitted thereover. The inner member $a$, rearwardly thereof, is formed with a substantially elliptical-shaped flange, whereby the complementally formed shell member $a^1$ fit ted thereover is adapted to be securely jammed thereto against possible rotation in surface contact therewith, as will be clearly apparent from Figs. 1 and 2. The shell member $a^1$, carries the series of wire or other types of spokes $b$, a rim or felly $c$, and an inflatable or solid tire $d$. The inner member $a$, has splined or keyed thereto the axle $a^2$, provided with a tightening-nut $a^3$, on the front end thereof.

The forward front portion of the inner hub $a$, as shown in Fig. 1, is recessed interiorly of the same and provided with a series of beveled lugs $a^4$, having slots $a^5$, between them on the front end as clearly shown in Fig. 3. Beyond and in the rear of the location of the lugs in the front end of the inner hub $a$, it is offset as at $a^6$, in respect to the general contour of the hub to provide a surface contact for the lock-ring $a^7$, having on its inner perimeter beveled lugs $a^8$, with slots $a^9$, between the same, to thereby permit said ring to be quickly and effectively embraced and entered between the inner hub member lugs and slots so that by a turning of the said ring in its connection with said hub member, in the direction of the thrust of the wheel, the ring is automatically securely interlocked with said hub against possible disengagement, aided in this respect by the threading after the said members $a$ and $a^1$ and ring $a^7$, are positioned to constitute the composite hub, the dust or mud cap, $a^{10}$, to place, as clearly shown in Fig. 1, of the drawings. The lock ring $a^8$, in one side wall is provided with an annular groove $a^{11}$, in which engages the front end of the shell $a^1$, to serve as dust or mud-guard thereabout, as well as to prevent possible shifting or detachment of the said lock-means in position as will be clearly understood from Fig. 1, of the drawings.

It will be observed from the foregoing description that the tightening of the lock-ring $a^7$, to the hub jams the substantially elliptical-shaped flange of said inner hub member $a$, against the rear complemental surface of the shell member $a^1$, so that to remove the said wheel, it is only necessary to first remove the dust cap $a^{10}$, and turn then slightly the lock-ring $a^7$, in a reverse direction to that it occupies, in its locked connection with the inner hub member $a$, to permit of the instant release of the said shell member $a^1$, from the inner hub member $a$, and therewith the tired wheel, as part of the said shell.

Having thus described the nature and objects of my invention, what I claim as new and desire to secure by Letters Patent is:—

1. A wheel of the character described, consisting of separable telescoping hub members, means for preventing relative rotation of said hub members, spaced beveled lugs on the outer end of the inner of said hub-members, a locking-means having complemental spaced beveled lugs, the emplacement of the locking-means forcing the outer hub-member to seated position on the inner hub member and a dust or mud cap closing the outer end of the said inner hub member and provided with a flange bearing against said means and locking it in position.

2. A wheel of the character described, consisting of separable telescoping hub-members, means for preventing relative rotation of said hub-members, spaced beveled lugs on the outer end of the inner of said hub-members, a locking ring having complemental spaced beveled lugs, and a circular groove on the inner side to engage the front end of the said outer hub-member, the emplacement of the said locking-ring forcing the said outer hub-member to seated position on the said inner hub-member and a dust or mud cap closing the outer end of the said inner hub-member and provided with a flange bearing against said ring and locking it in position.

In witness whereof, I have hereunto set my signature, in the presence of two subscribing witnesses.

RICHARD A. PENROSE.

Witnesses:
J. WALTER DOUGLASS,
A. C. SHONERT.